United States Patent Office 3,450,615

Patented June 17, 1969

3,450,615

PHOTOPOLYMERIZATION USING COPOLYMERS CONTAINING ALDEHYDE GROUPS THEREIN AS PHOTOINIATORS

Roger J. Eldred, Warren, and Tzu J. Mao, Royal Oak, Mich., assignors to General Motors Corporation, Detroit, Mich., a corporation of Delaware No Drawing. Filed Apr. 4, 1966, Ser. No. 547,120
Int. Cl. C08f 1/20, 15/02
U.S. Cl. 204—159.15 7 Claims

ABSTRACT OF THE DISCLOSURE

A method of initiating the photopolymerization of polymerizable ethylenically unsaturated compounds such as acrylic monomers under the effect of ultraviolet light by the use of copolymers containing aldehyde groups. An example of such copolymers is a methacryaldehyde-methylmethacrylate copolymer which serves as a photo initiator in the polymerization of glycidyl methacrylate.

This invention relates to photopolymerization of unsaturated organic compounds in bulk, and more particularly to the use of copolymers as photopolymerization initiators.

It is known that polymerizable ethylenically unsaturated compounds such as the acrylic monomers and the like may be polymerized by the action of ultraviolet light. The two types of photo initiators most frequently used for the polymerization of acrylic monomers are the peroxide initiators and the $\alpha,\alpha'$-dicyanoazoalkane initiators. These generally excellent initiators are not entirely free from disadvantages; for example, the peroxides often introduce undesirable oxidizing monomeric residues in the polymer, tend to have an oxidizing action on the reaction mixture end are somewhat hazardous to handle. The $\alpha,\alpha'$-dicyanoazoalkanes introduce objectionable monomeric residues and nitrogen gas in the polymer. Aromatic aldehydes are also used as initiators in the photopolymerization of acrylic monomers; however, these compounds are volatile and many of these aldehydes have an obnoxious odor. All of the prior art initiators mentioned above have a tendency to migrate to the surface of the polymer because the molecular weight of these monomeric initiators is low in contrast to the high molecular weight of the polymers.

It is the primary object of this invention to provide an improved class of initiators which has extremely low volatility, which is polymeric in nature so as not to contaminate the polymer with monomeric material and which has extremely low mobility or tendency to migrate to the surface of the polymer. These and other objects are accomplished by mixing a copolymer containing aldehyde groups therein with an ethylenically unsaturated compound such as an acrylic monomer and subjecting the solution to ultraviolet radiation until the polymerization has been effected.

Further objects and advantages of the present invention will be apparent from the following detailed description, reference being had to the following examples whrein the preferred embodiments of the present invention are clearly shown.

This new class of photo initiators are copolymers in which aldehyde groups are present. These copolymers are formed by reacting a polymerizable ethylincally unsaturated compound such as an acrylic monomer with an aldehyde having a polymerizable ethylenically unsaturated bond such as methacrylaldehyde. A methacryladehyde-methyl methacrylate copolymer is a typical example of this new class of photo initiators and was formed by reacting methyl methacrylate with methacrylaldehyde.

When this type of copolymer, for example the methacrylaldehyde-methyl methacrylate copolymer mentioned above, is mixed with an ethylenically unsaturated compound such as an acrylic monomer and exposed to ultraviolet light, free radicals are formed on the available aldehyde groups in the copolymer. These polymeric free radicals are then available to initiate the photopolymerization of the acrylic monomer.

In general, the polymerizable aldehyde which is used to form the copolymer falls into one of two types. Type 1 has the following structure:

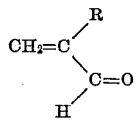

where R is hydrogen, an alkyl group or an aryl group. Examples of the Type 1 polymerizable aldehyde are acrylaldehyde, methacrylaldehyde, and ethacrylaldehyde. Type 2 has the following structure:

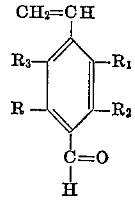

where $R_1$, $R_2$, $R_3$, and $R_4$ is hydrogen, chlorine, an alkyl group, an aryl group, or an alkoxy group. Examples of the Type 2 polymerizable aldehyde are p-vinyl benzaldehyde, *o*-methyl *p*-vinyl benzaldehyde, *o*-methoxy *p*-vinyl benzaldehyde, *o*-chloro *p*-vinyl benzaldehyde and the like.

The polymerizable ethylenically unsaturated compound which is polymerized with the polymerizable aldehyde to form the copolymer may be an acrylic monomer such as methyl methacrylate, ethyl methacrylate, methyl acrylate, ethyl acrylate, and the like, styrene, acrylonitrile, acrylamide, methacrylonitrile, vinyl acetate and the like. Methyl methacrylate and styrene are preferred monomers bacause of their low cost.

The concentration of the aldehyde in the copolymer ranges from about 5% to 50%. At concentrations below 5% aldehyde the resulting copolymer does not have enough aldehyde groups with which to form free radicals to effectively photo initiate the polymerization. Concentrations above 50% aldehyde in these copolymers are not desirable since the aldehyde groups in such copolymers have a tendency to react with one another to form undesirable reaction products which cause the resulting copolymers to have a low solubility in acrylic monomer solutions. In a methacrylaldehyde-methyl methacrylate copolymer the maximum concentration of methacrylaldehyde that may be conveniently obtained is 25%.

The following examples describing the preparation of representative copolymers suitable for use as polymerization initiators are given to assist one in the practice of this invention.

(A) Methacrylaldehyde-methyl methacrylate copolymer

A solution containing 21.5 grams methacrylaldehyde, 135 grams methyl methacrylate, 80 grams benzene and 0.1 gram azobisisobutyronitrile was stirred for 2 hours at 60° C. An additional 0.1 gram of azobisisobutyronitrile catalyst was added and the reaction was continued for 4 hours. The temperature was then increased to 80° C. to destroy or use up any remaining catalyst. The reaction mixture was then flushed with nitrogen to remove any unreacted methacrylaldehyde. The copolymer was precipitated in heptane, dissolved in acetone, and reprecipitated in heptane. The cbolopymer contained 22% methacrylaldehyde. The structure of the copolymer formed in this example is shown below.

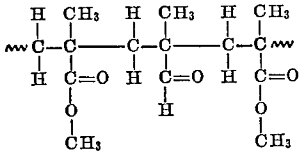

(B) The methacrylaldehyde-styrene copolymer

A solution containing 4.2 grams methacrylaldehyde, 27 grams styrene, 20 grams benzene and 0.1 gram azobisisobutyronitrile was stirred for 4 hours at 60° C. An additional 0.1 gram of azobisisobutyronitrile catalyst was added and the reaction was continued for 12 hours. The temperature was then increased to 80° C. to destroy or use up any remaining catalyst. The reaction mixture was then flushed with nitrogen to remove any unreacted methacrylaldehyde. The copolymer was precipitated in methanol. The copolymer contained about 20% methacrylaldehyde.

(C) Acrylaldehyde-methyl methacrylate copolymer

A solution containing 1.0 gram acrylaldehyde, 9.9 grams methyl methacrylate, 33.3 grams benzene and 0.013 grams azobisisobutyronitrile was stirred at 60° C. for 46 hours. The copolymer was precipitated in heptane, dissolved in acetone, and reprecipitated in heptane. The copolymer contained 16% acrylaldehyde.

The copolymers described above are an effective class of initiators in the photopolymerization of polymerizable ethylenically unsaturated compounds such as the acrylic monomers, acrylonitrile, methyl acrylonitrile, and vinyl acetate. The copolymer may be used as the initiator in the photopolymerization of any polymerizable ethylenically unsaturated compound which does not absorb more than 50% of the light at the wavelength that the copolymer aldehyde absorbs which is in the area of 2800 angstroms and above; that is, if the monomer does not absorb a major portion of the light, there is sufficient light passing through the monomer to form the free radicals on the copolymer aldehyde groups. In the case of the acrylic monomers, acrylonitrile, methacrylonitrile, and vinyl acetate, less than 50% of the light is absorbed by these monomers, thereby permitting the copolymer aldehyde groups to form free radicals. Included in the term acrylic monomer as used herein and as illustrated in the examples, refers to esters of acrylic acid and methacrylic acid. These esters are formed by reacting one of the acids mentioned above with an alcohol or a substituted alcohol containing 1 to 18 carbon atoms. Suitable alcohols include methyl alcohol, butyl alcohol, hexyl alcohol, 2-ethyl hexyl alcohol, decyl-octyl alcohol, lauryl alcohol, stearyl alcohol, dimethylaminoethyl alcohol, t-butylaminoethyl alcohol, glycidyl alcohol, and 2-methoxyethyl alcohol.

The process of the present invention will hereinafter be described in detail in terms of incorporating a methacrylaldehyde-methyl methacrylate copolymer as the initiator in the photopolymerization of various acrylic monomers.

In general, a suitable amount of the methacrylaldehyde-methyl methacrylate copolymer is stirred with an acrylic monomer until a homogeneous solution is obtained. The concentration of the copolymer in this solution ranges from about 4% to 40 weight percent, the 4% concentration representing the minimum amount of a copolymer containing 25 mole percent aldehyde that will efficiently polymerize the solution. The maximum concentration of 40% copolymer represents the upper limit of solubility of the copolymer in the monomer solution. If the acrylic monomer used has a sufficiently low vapor pressure, the solution may be placed in an open reaction receptacle under atmospheric pressure; however, if the acrylic monomer has a high vapor pressure, it may be necessary to place the solution in a closed vessel under a suitable superimposed pressure in order to prevent excessive loss of the monomer due to volatilization. If a volatile acrylic monomer under superimposed pressure is to be polymerized, the reaction vessel should be constructed of a material which will permit the maximum amount of ultraviolet radiation to pass through the reaction vessel. The reaction vessel should not be constructed of a soft glass since soft glass will not transmit wavelengths below 3500 angstroms. Pyrex glass will not transmit below about 3000 angstroms. Vycor test tubes or reaction vessels are constructed of a material which will permit lower wavelength radiation to pass through; these reaction vessels are frequently used in a laboratory for photochemical polymerization. The reactions of this invention in which a volatile acrylic monomer is used are carried out in Vycor test tubes which is loosely corked or which is fitted with a stopcock. The purpose of the cork is to prevent excessive volatilization and at the same time to prevent excessive pressure from building up in the system. The acrylic solution containing the initiator is then subjected to ultraviolet light by means of an ultraviolet lamp (Hanovia) with a high pressure, mercury vapor arc to provide radiation with wavelengths in the region of 2800 angstroms and above, positioned a distance of 1 or 2 inches from the solution for periods of time ranging from a few minutes to 45 minutes. As will hereinafter appear, clear, tough solid polymers are obtained when the methacrylaldehyde-methyl methacrylate copolymer is used as an initiator in the photopolymerization of acrylic monomers.

The invention is illustrated in greater detail by the following examples.

Example 1

| | Parts by weight |
|---|---|
| Glycidyl methacrylate | 475 |
| Methacryleldehyde-methyl methacrylate copolymer | 125 |

The solution of these two components was prepared and placed in an aluminum dish at room temperature. The solution was then subjected to radiation from an ultraviolet lamp which was positioned a distance from 1 to 2 inches away from the solution. In two minutes the liquid solution turned into a clear, tough solid. The yield of the polymer was 80%. In contrast, a glycidyl methacrylate solution without the copolymer catalyst took over 12 minutes to polymerize and had only a 14% yield.

Example 2

| | Parts by weight |
|---|---|
| Methyl methacrylate | 875 |
| Methacrylaldehyde-methyl methacrylate copolymer | 125 |

The solution of these two components was prepared and placed in an aluminum dish at room temperature. The solution was then subjected to radiation from an ultraviolet lamp which was positioned a distance of 1 to 2 inches away from the solution. In 15 minutes the liquid solution turned into a clear, tough solid. The yield of the polymer was 78%.

Example 3

| | Parts by weight |
|---|---|
| Glycidyl methacrylate | 1000 |
| Methacrylaldehyde-styrene copolymer | 100 |

The solution of these two components was prepared and placed in an aluminum dish at room temperature. The solution was then subjected to radiation from an ultraviolet lamp which was positioned a distance of 1 to 2 inches away from the solution. In 3.5 minutes the liquid solution turned into a clear, tough solid. The yield of the polymer was 96%.

This invention provides a process whereby the polymerization of acrylic monomers and other polymerizable ethylenically unsaturated compounds is effected with the help of copolymer initiators offering several advantages over conventional initiators. Thus, the copolymer initiators containing the aldehyde groups are non-volatile thereby making them especially useful in photopolymerization processes carried out at elevated temperatures. In view of their polymeric nature which results in extremely low mobility of the initiator, the copolymers have little tendency to migrate to the surface of the polymer since the mobility is almost non-existent. These copolymers do not introduce any monomeric residues or any oxidizing residue in the polymers and as a result, provide a more stable polymer which has a higher resistance to oxidation and chemical attack.

The copolymer photopolymerization initiators described in this invention are particularly useful in the formation of polymeric protective coatings where the materials involved are heat sensitive. These copolymer initiators may also be used in the formation of thin sheets of plastic. Another use in which these copolymer initiators can be used advantageously is in the formation of polymer castings which are conducted at atmospheric pressures without heat to form a bubble-free plastic casting.

While the invention has been described in terms of a preferred embodiment, it is to be understood that the scope of the invention is not so limited thereby except as defined by the following claims.

What is claimed is:

1. In the bulk photopolymerization of ethylenically unsaturated compounds that do not absorb more than 50% of the light transmitted in the wavelength region of 2800 angstroms and above, the improvement which comprises conducting said photopolymerization in the presence of a photo initiator consisting essentially of a copolymer of an ethylenically unsaturated monomer with an ethylenically unsaturated monomer having a free aldehyde group, said aldehyde groups in said copolymer capable of forming free radicals in a sufficient quantity to initiate said photopolymerization.

2. A process according to claim 1 wherein said copolymer contains 5 to 50 weight percent polymerized aldehyde monomer.

3. A process according to claim 1 wherein said copolymer contains an aldehyde of the formula

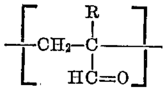

where R represents a member of the group consisting of hydrogen, alkyl group, and an aryl group.

4. A process according to claim 1 wherein said copolymer contains a group of the formula

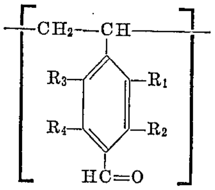

where $R_1$, $R_2$, $R_3$, and $R_4$ represents a member of the group consisting of hydrogen, chlorine, alkyl group, aryl group, and an alkoxy group.

5. A process according to claim 1 wherein said copolymer contains polymerized monomers where said monomers are taken from the group consisting of acrylic monomers, styrene, acrylonitrile, methacrylonitrile, and vinyl acetate.

6. A process according to claim 1 wherein said unsaturated compounds are taken from the group consisting of acrylic monomers, acrylonitrile, methacrylonitrile, and vinyl acetate.

7. A process for photopolymerizing an acrylic monomer comprising the steps of mixing said acrylic monomer with a copolymer of an ethylenically unsaturated monomer with an ethylenically unsaturated monomer having a free aldehyde group, and subjecting the resulting mixture to the photopolymerizing effect of radiation in the wavelength region of 2800 angstroms and above to polymerize said acrylic monomer, said aldehyde group in said copolymer capable of forming free radicals in sufficient quantity to initiate said photopolymerization.

References Cited

UNITED STATES PATENTS

| | | | |
|---|---|---|---|
| 2,367,661 | 1/1945 | Agre | 204—159.23 |
| 2,857,322 | 10/1958 | Lard | 204—159.23 |
| 3,129,195 | 4/1964 | June et al. | 260—29.6 |

OTHER REFERENCES

Izard, Polymer containing free aldehyde groups, Ind. & Eng. Chem., vol. 42, 1950, pp. 2108–2110.

SAMUEL H. BLECH, *Primary Examiner.*

RICHARD B. TURER, *Assistant Examiner.*

U.S. Cl. X.R.

204—159.21, 159.23; 260—67, 73, 836, 875, 881, 885, 886